(12) United States Patent
Hong

(10) Patent No.: US 7,812,075 B2
(45) Date of Patent: Oct. 12, 2010

(54) SOLVENT-FREE POLYURETHANE-BASED ARTIFICIAL LEATHER HAVING THE TEXTURE OF HUMAN SKIN AND THE PREPARATION METHOD THEREOF

(75) Inventor: Chae Hwan Hong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 12/283,327

(22) Filed: Sep. 10, 2008

(65) Prior Publication Data

US 2009/0247671 A1    Oct. 1, 2009

(30) Foreign Application Priority Data

Mar. 25, 2008    (KR) .................... 10-2008-0027350

(51) Int. Cl.
*C08L 89/00* (2006.01)
*C08G 18/00* (2006.01)
*C08G 65/34* (2006.01)

(52) U.S. Cl. .............................. 524/25; 524/17; 528/85; 528/425; 527/204

(58) Field of Classification Search ............ 524/25
See application file for complete search history.

(56) References Cited

U.S. PATENT DOCUMENTS 5,710,190 A * 1/1998 Jane et al. .................. 521/102
2006/0094800 A1 * 5/2006 Jong ........................... 524/17
2007/0275227 A1 * 11/2007 Mashburn et al. ......... 428/316.6
2008/0004376 A1 * 1/2008 Jong ........................... 524/17
2008/0132134 A1 * 6/2008 Mashburn et al. ........... 442/223
2008/0234458 A1 * 9/2008 West ........................... 528/85
2008/0242822 A1 * 10/2008 West .......................... 527/204

FOREIGN PATENT DOCUMENTS

| JP | 05-339507 | 12/1993 |
|---|---|---|
| JP | 06-009877 | 1/1994 |
| JP | 08-296178 | 11/1996 |
| JP | 09-049171 | 2/1997 |
| KR | 10-0227538 | 8/1999 |
| KR | 10-2004-0027419 | 4/2004 |
| KR | 10-2007-0027930 | 3/2007 |

* cited by examiner

*Primary Examiner*—Marc S Zimmer
*Assistant Examiner*—Noah Frank
(74) *Attorney, Agent, or Firm*—Edwards Angell Palmer & Dodge LLP; Peter F. Corless

(57) ABSTRACT

The present invention relates to a solvent-free polyurethane-based artificial leather having the texture of human skin, and particularly to artificial leather comprising soy protein isolate and solvent-free polyurethane resin, where the use of soy protein isolate provides a higher water content than that of the conventional artificial leather to improve sensitivity properties such as tactile sensation and the use of the solvent-free polyurethane resin provides higher heat resistance and better mechanical properties than those of the conventional artificial leather, without using an organic solvent, thereby enabling to maintain clean indoor air.

12 Claims, 2 Drawing Sheets

SOLVENT-FREE POLYURETHANE-BASED ARTIFICIAL LEATHER HAVING THE TEXTURE OF HUMAN SKIN AND THE PREPARATION METHOD THEREOF

CROSS-REFERENCE TO RELATED APPLICATION

This application claims under 35 U.S.C. §119(a) the benefit of Korean Patent Application No. 10-2008-0027350 filed Mar. 25, 2008, the entire contents of which are incorporated herein by reference.

BACKGROUND (a) Technical Field

The present invention relates to a solvent-free polyurethane-based artificial leather having the texture of human skin, and particularly to artificial leather comprising soy protein isolate and solvent-free polyurethane resin, where the use of soy protein isolate provides a higher water content than that of the conventional artificial leather to improve sensitivity properties such as tactile sensation and the use of the solvent-free polyurethane resin provides higher heat resistance and better mechanical properties than those of the conventional artificial leather, without the use of an organic solvent, and thereby maintains clean indoor air.

(b) Background Art

Leather can be generally divided into natural leather and artificial leather. Because natural leather is obtained by processing the leather of animals, it is usually high in price due to limited output. Continuous processing of natural leather is impossible, and color variation and quality uniformization can also be difficult.

In contrast, artificial leather can be obtained by using fabrics such as non-woven fabrics or woven fabrics. However, artificial leather is still inferior to natural leather in sensitivity properties such as tactile sensation.

Conventional artificial leather is generally prepared by using a polymer or synthetic materials, is often uncomfortable, cold and slick to the touch, causes eye fatigue due to reflected light, and produces an unpleasant feeling because of unabsorbed sweat. Thus, conventional artificial leather is inferior to natural leather in sensations such as tactile sensation. In particular, due to its low water absorptive properties, artificial leather can be sticky as a result of humidity produced by the human body or from the surroundings. Artificial leather has not been satisfactory to meet the high quality demands by customers in color, gloss, processability, design and tactile sensation.

Various processes have been disclosed for the preparation of artificial leather in an attempt to meet the customer needs. For example, Korean Patent No. 10-0581330 discloses artificial leather prepared by using a porous structure of solvent-free polyurethane, which is superior to the conventional artificial leather in mechanical property, anti-yellowing and chemical resistance, but showing insufficient sensitivity properties such as tactile sensation. Korean Patent No. 10-0706403 filed by the present inventors discloses artificial leather comprising pulverized silk proteins and polyvinyl chloride resin. Although this artificial leather is superior in sensitivity properties, the production costs are too high for commercial application due to the use of expensive silk.

Most of the conventional polyurethane-based artificial leather polyurethane resin has been manufactured into one-component type. The one-component resin is a "polyurethane-organic solvent solution" comprising linear polymer prepared by polyaddition of diisocyanate and the same molar amount of polymer diol along with chain extender, and organic solvent such as DMF (N,N-dimethyl formide), MEK (methyl ethyl ketone), TOL (toluene) as a main ingredient. However, such artificial leather prepared by using an organic solvent produces odors and is an endocrine disruptor due to the volatility of the organic solvent.

Accordingly, there has been an increasing need for artificial leather that is superior in sensitivity properties such as tactile sensation as well as heat resistance and mechanical property in the fields of artificial leather manufacture, furniture industry and the automobile industry.

As a result, the present inventors have found that it is necessary to increase the water absorptive power of artificial leather in order to improve the sensitivity properties of natural leather such as tactile sensation.

The instant invention is directed to providing optimum content of ingredients and an application method for applying soy protein isolate to solvent-free polyurethane resin, and to minimizing the odor-production of artificial leather by solvent-free polyurethane resin instead of organic solvent.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a solvent-free polyurethane-based artificial leather having the texture of human skin, which comprises 85-95 wt % of solvent-free polyurethane resin and 5-15 wt % of a soy protein isolate having an average diameter of 1-75 µm.

In one embodiment, the present invention also provides a process of preparing solvent-free polyurethane-based artificial leather having the texture of human skin, the process comprising, in preferred aspects:

(a) preparing a resin premix by stirring a mixture comprising 99-99.7 wt % of a polyol having an average molecular weight of 100-20,000, 0.2-0.7 wt % of a retarding catalyst, 0.05-0.2 wt % of a surfactant and 0.01-0.1 wt % of water;

(b) preparing a diisocyanate prepolymer by conducting a urethane reaction with 35-40 wt % of a polyol having an average molecular weight of 100-20,000, 50-55 wt % of a diisocyanate-based compound and 5-15 wt % of soy protein flour at 38-42° C. for 10-15 minutes; and (c) preparing a raw material of artificial leather by conducting a reaction between the mixture and the diisocyanate prepolymer in the mixing ratio of 1:1.5-2.5; and (d) forming a surface layer with the raw material of artificial leather.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum).

As referred to herein, a hybrid vehicle is a vehicle that has two or more sources of power, for example, both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
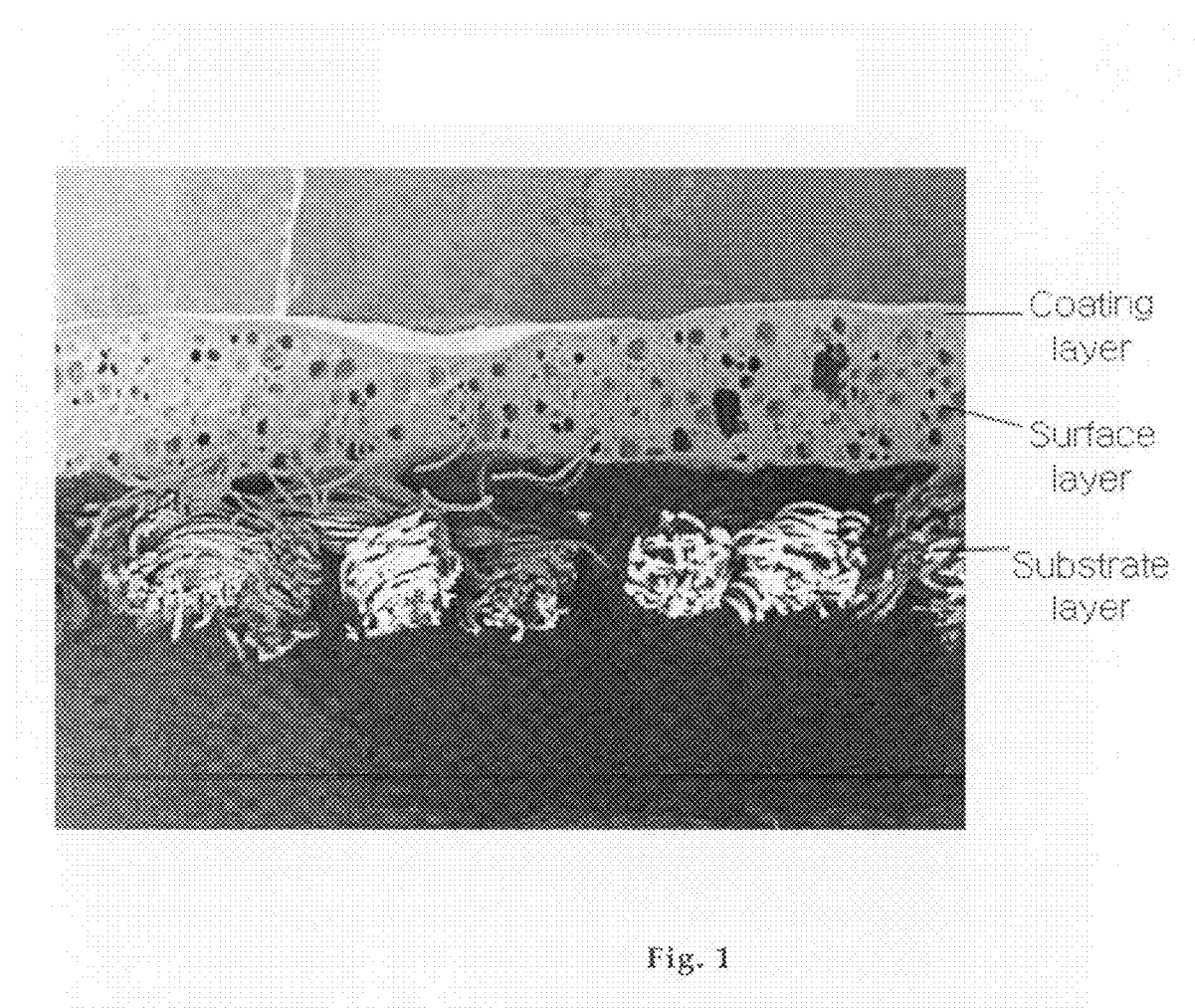
FIG. 1 is a photograph of the cross-section of polyurethane artificial leather for an automobile seat, which comprises a substrate layer (lower fabric layer), a polyurethane surface layer and a coating layer, wherein soy protein flours were dispersed in the surface layer.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a solvent-free polyurethane-based artificial leather having the texture of human skin which comprises a solvent-free polyurethane resin and a soy protein isolate. In one embodiment, the solvent-free polyurethane-based artificial leather having the texture of human skin comprises 85-95 wt % of a solvent-free polyurethane resin. In another embodiment, the solvent-free polyurethane-based artificial leather having the texture of human skin further comprises 5-15 wt % of a soy protein isolate having an average diameter of 1-75 μm.

The invention also features a motor vehicle comprising the solvent-free polyurethane-based artificial leather having the texture of human skin as described herein.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

In certain preferred embodiments, the present invention features introducing pulverized soy protein to improve the water absorptive power of artificial leather, and also features using solvent-free polyurethane resin to minimize the amount or prevent the production of odor-producing material or endocrine disruptors.

In certain preferred embodiments, the invention provides a detailed description of solvent-free polyurethane-based artificial leather.

In certain preferred embodiments, soy bean is treated to suitably provide the following material. In further preferred embodiments, soybean oil is produced.

Preferably, the remaining material without oil is called defatted soy flake. Soy flour, soy concentrate and soy protein isolate ('SPI') can be suitably obtained from the defatted soy flake. Preferably, SPI comprises 90% or higher of protein along with other hydrocarbons. In certain preferred embodiments, the present invention relates to the use of SPI.

In other preferred embodiments, the invention provides a description of a solvent-free polyurethane-based artificial leather.

In certain embodiments, artificial leather comprises a solvent-free polyurethane resin and a soy protein isolate.

In further embodiments, artificial leather herein suitably comprises 85-95 wt % of a solvent-free polyurethane resin and 5-15 wt % of a soy protein isolate having an average diameter of 1-75 μm.

In certain embodiments of the present invention, a solvent-free polyurethane resin preferably comprises:

a resin premix suitably comprising 99-99.7 wt % of a polyol having an average molecular weight of 100-20,000, 0.2-0.7 wt % of a retarding catalyst, 0.05-0.2 wt % of a surfactant and 0.01-0.1 wt % of water; and a diisocyanate prepolymer suitably comprising 40-50 wt % of a polyol having an average molecular weight of 100-20,000 and 50-60 wt % of a diisocyanate-based compound; at an equivalence ratio of 1:1.5-2.5.

In other preferred embodiments, the invention provides a detailed description of the aforementioned ingredients.

In certain embodiments, a solvent-free polyurethane resin of the present invention suitably comprises 5-15 wt % of a soy protein isolate having an average diameter of 1-75 μm. When the average diameter is suitably lower than 1 μm, coagulation can happen inside the artificial leather due to insufficient dispersion, thereby lowering properties. When the average diameter is suitably higher than 75 μm, water absorptive power can decrease due to the decrease in surface area compared to the number of particles. When the amount of the soy protein isolate is suitably less than 5 wt %, the water absorptive power may be insufficient. When the amount is suitably more than 15 wt %, properties can deteriorate due to relatively low content of the solvent-free polyurethane resin.

In certain preferred embodiments of the present invention, the solvent-free polyurethane resin suitably comprises a resin premix and a diisocyanate prepolymer. In further embodiments, the resin premix and the diisocyanate prepolymer can preferably comprise polyol with an average molecular weight of 100-20,000, or in further embodiments more preferably 500-15,000. In other embodiments, the polyol can be a suitably polyester polyol or a polyether polyol. When the average molecular weight of the polyol is lower than 100, properties of final product can suitably deteriorate. When it is higher than 20,000, processability can suitably deteriorate due to the increase in viscosity.

In other further embodiments, the polyester polyol can have an average hydroxyl value of 100-450 mg KOH/g, preferably 150-400 mg KOH/g, and a viscosity of 1,000-10,000 cps (25° C.), preferably 3,000-85,000 cps (25° C.).

Preferably, when the average hydroxyl value is lower than 100 mg KOH/g, compatibility of the polyester polyol can be suitably insufficient due to excessively high viscosity. When it is higher than 450 mg KOH/g, suitable hardness of a produced polyurethane resin can increase.

In other embodiments, the polyether polyol is preferred to have an average functional group number of 2-5 and is preferred to have an average hydroxyl value of 200-850 mg KOH/g. When the average functional group number is lower than 2, moldability can be suitably insufficient due to relatively low crosslinkability. When the average functional group number is higher than 5, excessively high crosslink can happen. In further embodiments, when the average hydroxyl value is lower than 200 mg KOH/g, the reactivity of urethane may be suitably insufficient due to small amount of polyol functional group that can react with isocyanate. In other further embodiments, when the average hydroxyl value is higher than 850 mg KOH/g, viscosity may abruptly increase suitably due to excess crosslinking reaction.

In certain embodiments, the resin premix suitably comprises a retarding catalyst. In preferred embodiments of the present invention, tertiary amine catalyst is preferably used as a retarding catalyst to suitably retard the urethane binding reaction because the use of the conventional catalyst causes an abrupt urethane binding reaction, thus preventing sufficient forming of a coating layer in artificial leather. Suitable examples of the tertiary amine catalyst include, but are not limited to, triethylene diamine (TEDA), triethylamine, tripropylamine, tributylamine, trioctylamine, pentamethylenediethylene triamine, dimethylcyclohexylamine, tris(3-dimethylamino)propylhexahydrotriamine, a derivative thereof and a mixture thereof. The resin premix suitably comprises a retarding catalyst in the amount of 0.2-0.7 wt %. Suitably, when the amount is more than 0.7 wt %, initial reaction rate can be too high. Further, when the amount is less than 0.2 wt %, the catalytic effect can be insufficient. In other embodiments, the resin premix preferably comprises a suitable surfactant in the amount of 0.05-0.2 wt % to prevent the aggregation or agglomeration or destruction of the cells formed on the surface layer in a polyurethane-based artificial leather of the present invention. The conventional surfactant, preferably, but not only limited to, a silicone surfactant, can be used in the present invention. When the amount is less than 0.05 wt %, molding may be suitably non-uniform. When the amount is higher than 0.2 wt %, molding may be suitably retarded.

In other embodiments, the resin premix preferably comprises 0.01-0.1 wt % of water for the foaming effect of polyurethane-based artificial leather. When the amount is more than 0.1 wt %, cracks may occur due to excessive foaming.

In preferred embodiments, the aforementioned polyol of the resin premix can also be used as the diisocyanate prepolymer. The polyol and diisocyanate-based compound are suitably mixed to cause a urethane reaction. A free NCO at the ends of diisocyanate becomes 15-20 wt %. In certain embodiments of the invention, when the free NCO content is less than 15 wt %, the properties of the final products may deteriorate. In other embodiments, when the content is higher than 20 wt %, the flexibility of product may be lowered due to the increase in rigidity.

Preferably, the diisocyanate compound is not limited to any specific compound or compounds. In certain embodiments, examples of the diisocyanate compound include, but are not limited to, aromatic, aliphatic and araliphatic diisocyanate compounds, more preferably toluene diisocyanate, diphenylmethane diisocyanate (MDI), torilene diisocyanate (TDI), hexamethylene diisocyanate, derivatives thereof and a mixture thereof. In particular embodiments of the invention, the diisocyanate compound is used in the amount of 50-60 wt %. In other embodiments, when the amount is less than 50 wt %, the properties of final product may suitably deteriorate. In still other embodiments, when the amount is higher than 60 wt %, the flexibility may be suitably lowered.

In other embodiments of the invention, polyurethane-based artificial leather of the present invention is suitably prepared by conducting a urethane binding reaction by mixing resin premix and diisocyanate compound at a suitable equivalence ratio of 1:1.5-2.5. When the mixing ratio is less than 1:1.5, tensile properties may suitably deteriorate. When the ratio is higher than 1:2.5, the flexibility of product may be suitably lowered due to the increase in rigidity.

In preferred embodiments of the invention, polyurethane-based artificial leather of the present invention preferably comprising 85-95 wt % of a solvent-free polyurethane resin and 5-15 wt % of a soy protein isolate having an average diameter of 1-75 μm may further comprise a layer suitably selected from the group consisting of a foaming layer, a coating layer and a substrate layer. In further embodiments, the foaming layer may be suitably prepared without limitation by using at least one selected from the group consisting of, but not limited to, polyurethane foam and poly(vinyl chloride) resin, which are generally used as a foam.

Any conventional coating layer that is used for preparing artificial leather may also be used in the present invention. Preferable examples of a coating layer suitably include water-soluble urethane resin, water-soluble acrylurethane resin and a mixture thereof. Preferably, the composition may be 100 wt % of water-soluble urethane resin 100 or a mixture of water-soluble urethane resin and water-soluble acrylurethane resin (2-2.5:1 weight ratio).

In further embodiments, the substrate layer is not limited as artificial leather. Examples of the substrate layer include, but are not limited to, woven fabric, non-woven fabric, knitted fabric, raw cotton and a mixture thereof. Preferably, either napped or non-napped fabric may be used in the present invention.

As described herein, in certain embodiments the invention features a detailed description of a process of preparing polyurethane-based artificial leather.

In certain embodiments according to the present invention, a process of preparing a polyurethane-based artificial leather preferably comprises the steps of:

(a) suitably preparing a resin premix by stirring a mixture comprising 99-99.7 wt % of a polyol having an average molecular weight of 100-20,000, 5-15 wt % of a soy protein isolate having an average diameter 1-75 μm, 0.2-0.7 wt % of a retarding catalyst, 0.05-0.2 wt % of a surfactant and 0.01-0.1 wt % of water;

(b) suitably preparing a diisocyanate prepolymer by conducting a urethane reaction with 35-40 wt % of a polyol having an average molecular weight of 100-20,000, 50-55 wt % of a diisocyanate-based compound and 5-15 wt % of soy protein flour at 38-42° C. for 10-15 minutes; and (c) suitably preparing a raw material of artificial leather by conducting a reaction between the mixture and the diisocyanate prepolymer in an equivalence ratio of 1:1.5-2.5; and (d) suitably forming a surface layer with the raw material of artificial leather.

In further embodiments, the aforementioned step (b) can be conducted before the step (a).

In other embodiments, in step (a), the soy protein flour is suitably used in step (b) for preparing resin premix instead of in step (a) because the reactivity may decrease when soy protein flour is added to during the manufacture of resin premix.

In still other embodiments, in step (b), the urethane reaction is conducted at 38-42° C. for 10-15 minutes for suitably controlling the free NCO content at the ends of diisocyanate prepolymer within 15-20 wt %.

In further embodiments, in step (d), a surface layer is formed as raw material of artificial leather prepared in step (c) suitably undergoes polyurethane reaction. Thus suitably formed surface layer controls the absorption or release of surface water in the present invention. Preferably, depending on the use, the surface layer may be formed on a foaming layer or a substrate layer by using the conventional method.

In other further embodiments, the process of the polyurethane-based artificial leather may further comprises the step (e) of suitably coating a coating agent comprising at least one selected from the group consisting of, but not limited to, a water-soluble urethane resin and a water-soluble acryl urethane synthetic resin onto the surface layer according to Gravure coating method. The Gravure coating method is a coating method comprising engraving patterns on a cylinder and moving a coating composition with the patterns.

In preferred embodiments of the invention, the aforementioned polyurethane-based artificial leather of the present invention can be suitably used, for example, in an airplane seat, furniture seat and preferably an automobile seat.

EXAMPLES

The following examples illustrate the invention and are not intended to limit the same.

Example 1

Polyurethane-based artificial leather for an automobile seat suitably comprising the ingredients shown in Table 1 was prepared as set forth below.

(1) Preparation of Resin Premix

Resin premix was suitably prepared by stirring a mixture of 99.47 wt % of polyester polyol having average molecular weight of 8,000, 0.4 wt % of triethylene diamine, 0.1 wt % of silicone a surfactant and 0.03 wt % of water at a mixing rate of 5000 rpm for 10 minutes using a stirrer.

(2) Preparation of Diisocyanate Prepolymer

Diisocyanate prepolymer was suitably prepared by mixing 45 wt % of polyester polyol having average molecular weight of 8,000, 55 wt % of diphenylmethane diisocyanate and 10 wt % of soy protein isolate having average diameter of 15 μm at 40° C. for 12 minutes. A free NCO content was measured according to ASTM D 2572 by reacting 1 g of thus prepared diisocyanate prepolymer with excessive amount of o-dichlorobenzene solution comprising di-n-butylamine (reaction between amine and isocyanate). Remaining amine was suitably titrated with 0.1N HCl solution, thus providing a free NCO content of 18 wt %.

(3) Preparation of Polyurethane-Based Artificial Leather

Raw material of artificial leather was suitably prepared by mixing the resin premix and the diisocyanate prepolymer (1:1.5 weight ratio) in a mixing chamber at 40° C. and 1 kgf/cm$^2$ preferably at a high mixing speed.

Figure 2:
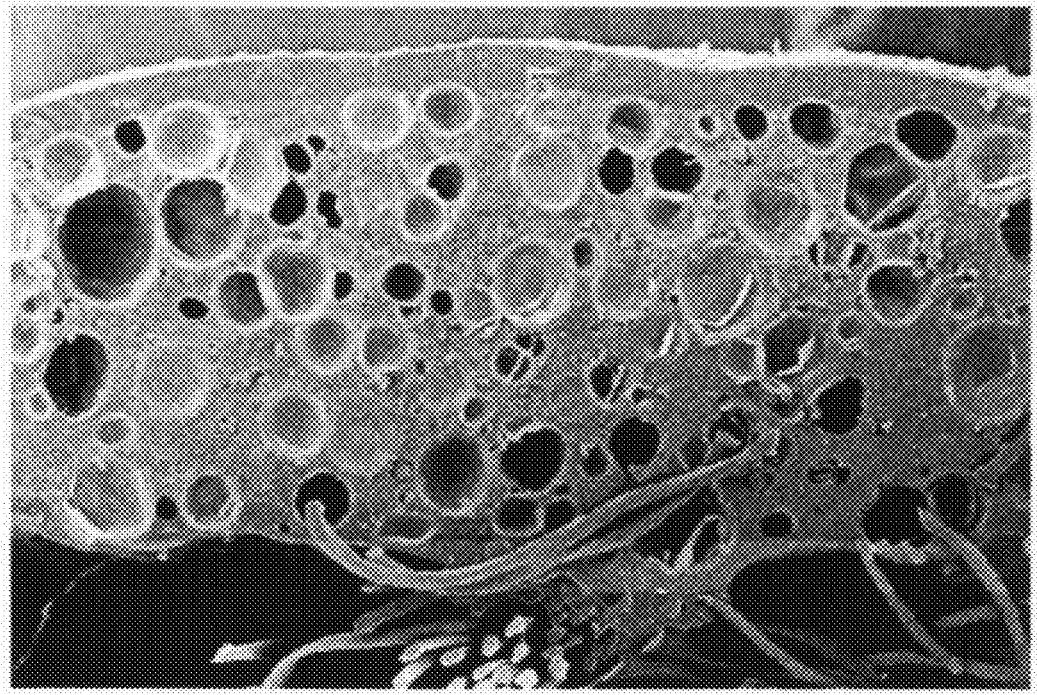
FIG. 2 is an enlarged photograph of the cross-section of polyurethane artificial leather, wherein soy protein flours were dispersed in the surface layer.

A surface layer was formed on a substrate layer by using the raw material of artificial leather and a roll coater, and coating agent was suitably coated on the surface layer, followed by thermal treatment in a heated oven, thereby providing artificial leather. Exemplary FIGS. 1 and 2 are photographs of the cross-section of thus prepared artificial leather.

Examples 2-4 and Comparative Example 1

Artificial leathers were prepared in Examples 2-3 and Comparative Example 1 by using the ingredients shown in Table 1 as set forth in Example 1. SPI was not added in Comparative Example 1, and pulverized silk protein according to Korean Patent No. 10-0806403 was added in Comparative Example 2.

Comparative Example 2

Artificial leather was prepared by adding pulverized silk proteins according to Korean Patent No. 10-0806403. The composition was as follows.

The pulverized silk proteins added in the artificial leather based on polyvinyl chloride preferably comprise:

a suitable surface layer comprising 90 wt % of polyvinyl chloride resin (brand name: PBI302, manufacturer: LG Chemistry) and 12 wt % of pulverized silk proteins having average diameter 6 μm (brand name: Silk Flour 100, manufacturer: Shindo Biosilk);

a suitable coating layer comprising pulverized silk proteins and water-based adhesives (65:45);

a suitable foaming layer comprising polyurethane foam; and a suitable substrate layer comprising woven fabric.

Comparative Example 3

Solvent-free artificial leather according to Korean Patent No. 10-0581330 was prepared as set forth in Example 5 of the Korean patent. Thus suitably prepared artificial leather comprises 13 weight parts of isocyanate-based compound (brand name: Desmodur VH-20, manufacturer: Bayer, Germany), 2.5 weight parts of a surfactant (brand name: SF-2944F, manufacturer: Toray dow corning silicone), 0.07 weight parts of crosslinking catalyst (brand name: U-CATSA-610, manufacturer: San-apro ltd., Japan) relative to 100 weight parts of urethane prepolymer having hydroxyl ends (PTMG,NPG/AA, PPG-400(3F) and MDI-type prepolymer, OH value 2.2%, viscosity 21,000 cps/60° C., manufacturer: Baeksan Inc.).

TABLE 1

| Ingredients (unit: wt %) | | | Ex. 1 | Ex. 2 | Ex. 3 | Ex. 4 | Comp. Ex. 1 |
|---|---|---|---|---|---|---|---|
| Resin premix (A) | | Polyester polyol[1] | 99.47 | 99.37 | 99.37 | 99.43 | 99.47 |
| | Retarding catalyst | Triethylene diamine[2] | 0.4 | 0.5 | 0.5 | 0.4 | 0.4 |
| | Surfactant | Silicone surfactant[3] | 0.1 | 0.1 | 0.1 | 0.15 | 0.1 |
| | | Water | 0.03 | 0.03 | 0.03 | 0.03 | 0.03 |
| | Total | | 100 wt % | | | | |
| Diisocyanate (B) | Polyester polyol | | 37 | 39 | 36 | 37 | 45 |
| | Diphenylmethane diisocyante[4] | | 52 | 55 | 50 | 52 | 55 |
| | Soy protein isolate[5] | Average Particle size | 15 μm | 30 μm | 40 μm | 50 μm | — |
| | | Content | 10 | 6 | 14 | 10 | — |
| | Total | | 100 wt % | | | | |
| Mixing ratio (A:B) | | | 1:1.5 | 1:1.9 | 1:2.3 | 1:1.5 | 1:2.7 |

[1] Average molecular weight 8000, average hydroxyl value 230~300 mg KOH/g, average viscosity 10000~15000 cps, DC chemical
[2] Brand name: TEDA, manufacturer: Air Products
[3] Brand name: BABCO DC-193, manufacturer: Air Products
[4] Brand name: Cosmonate MC-70 (isocyanate content = 31.2 wt %, viscosity 197 cps/25° C.), manufacture: Kumho Mitsui Chemicals, Inc
[5] Brand name: Supro 760, manufacturer: Protein Technologies, U.S.

Test Example 1

Measurement of Water Absorption

Water absorptive-desorptive properties of the artificial leather prepared in Examples 1-4 and Comparative Examples 1-3 was suitably measured according to ASTM D 570 (Standard Test Method for Water Absorption of Plastics) in a temperature and humidity controllable chamber. Species were placed in the chamber at 50° C. and relative humidity of 50% for 1-3 hours. Water contents were measured and the results are presented in Table 2.

TABLE 2

| Water absorption ($g/m^2$) | Ex. 1 | Ex. 2 | Ex. 3 | Ex. 4 | Comp. Ex. 1 | Comp. Ex. 2 | Comp. Ex. 3 |
|---|---|---|---|---|---|---|---|
| After 1 hour | 1.2 | 1.0 | 1.5 | 1.3 | 0.5 | 1.5 | 0.6 |
| After 2 hours | 3.1 | 2.9 | 3.3 | 3.0 | 0.8 | 3.3 | 1.0 |
| After 3 hours | 3.8 | 3.6 | 4.1 | 3.8 | 1.0 | 4.2 | 1.2 |

According to Table 2, polyurethane-based artificial leather of the present invention shows superior water absorptive power, while artificial leather without comprising soy protein isolate of Comparative Examples 1 and 3 shows relatively lower water absorptive power.

Further, the results in Examples 1-4 show almost similar water absorptive power as compared to the conventional artificial leather based on polyvinyl chloride comprising pulverized silk proteins. Therefore, it was suitably ascertained as possible to produce low-priced artificial leather with improved texture by preferably replacing expensive pulverized silk proteins with soy protein isolate.

Test Example 2

Measurement of Properties

Moldability, heat resistance and anti-yellowing were suitably measured by using artificial leathers prepared in Examples 1-4 and Comparative Examples 1-3, and the results are presented in Table 3.

In preferred examples, the moldability was measured by evaluating the surface of products prepared according to Gravure roll coating method with the naked eye along with tactile sensation evaluation. Preferably, heat resistance was measured by evaluating the decoloration and cracks on product surface after the storage in an oven of 120° C. for 7 days. Anti-yellowing was measured by preferably evaluating the change in color with a weatherability tester after the irradiation (Xenon Arc) at 85° C. and 84 $MJ/m^2$. In some examples, lower anti-yellowing is preferred.

Evaluation of anti-yellow

1: No change in color
2: Little change in color
3: Noticeable change in color with the naked eye
4: Definite change in color
5: Different color can be clearly noticed.

TABLE 3

| Properties | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Moldability | Good | Good | Good | Good | Good | Average | Good |
| Heat resistance (180° C.) | Good | Average | Good | Good | Average | Average | Very good |
| Anti-yellowing | 2.5 | 3 | 3 | 2.5 | 3 | 3.5 | 2.5 |

According to Table 3, Examples 1-4 show almost similar properties as compared to the conventional artificial leather, thus ascertaining the superior properties of artificial leather according to the present invention.

Test Example 3

Measurement of the Degree of Smell

Odor production was observed by using artificial leathers prepared in Examples 1-4 and Comparative Examples 1-3 as set forth below. Odor production was suitably evaluated in view of the standards in Table 4, and the results are presented in Table 5.

Specimens were cut into predetermined dimensions, and stored in a 4 L sealed glass vessel at room temperature (23±2° C.) for 1 hour before the evaluation.

TABLE 4

| Level | Degree of smell |
|---|---|
| 1 | Irritating and strong smell |
| 2 | Strong smell |
| 3 | Weak but easily noticeable smell |
| 4 | Noticeable but negligible smell |
| 5 | Nearly unnoticeable smell |
| 6 | No smell |

TABLE 5

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Level | 4 | 3 | 4 | 4 | 3 | 2 | 4 |

According to Table 5, artificial leathers prepared in Examples 1-4 and Comparative Example 3 by using solvent-free polyurethane resin produce suitably negligible smell due to low content of volatile material, thus ascertaining negligible odor production of artificial leather of the present invention.

As described herein, polyurethane-based artificial leather of the present invention has superior texture that is similar to natural skin due to, for example, the improved water absorptive power. As described herein, odor production was also decreased by using suitable solvent-free polyurethane resin. Artificial leather of the present invention is expected to be used, for example, but not only limited to, a furniture seat, a train seat, an airplane seat, and particularly an automobile seat.

As described herein, s solvent-free polyurethane-based artificial leather of the present invention shows superior water absorptive power, and thus has a texture that is suitably similar to natural skin due to excellent sensitivity properties such as tactile sensation. Further, as compared to the conventional artificial leather, solvent-free polyurethane-based artificial leather of the present invention shows equivalent or, in certain embodiments, even superior heat resistance and mechanical properties, and also minimizes the production of odor and endocrine disruptors by excluding the use of organic solvents.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A solvent-free polyurethane-based artificial leather which comprises 85-95 wt % of a solvent-free polyurethane resin and 5-15 wt % of a soy protein isolate having an average diameter of 1-75 μm.

2. The solvent-free polyurethane-based artificial leather of claim 1, wherein the artificial leather further comprises at least one selected from the group consisting of a foaming layer, a coating layer and a substrate layer.

3. The solvent-free polyurethane-based artificial leather of claim 2, wherein the substrate layer is selected from the group consisting of woven fabric, non-woven fabric, knitted fabric, raw cotton and a mixture thereof.

4. The solvent-free polyurethane-based artificial leather of claim 1, wherein the solvent-free polyurethane resin comprises:
   a resin premix comprising 99-99.7 wt % of a polyol having an average molecular weight of 100-20,000, 0.2-0.7 wt % of a retarding catalyst, 0.05-0.2 wt % of a surfactant and 0.01-0.1 wt % of water; and
   a diisocyanate prepolymer comprising 40-50 wt % of a polyol having an average molecular weight of 100-20,000 and 50-60 wt % of a diisocyanate-based compound;
   at an equivalence ratio of 1:1.5-2.5.

5. The solvent-free polyurethane-based artificial of claim 4, wherein the polyol in the resin premix and the polyol in the diisocyanate prepolymer are selected from the group consisting of a polyester polyol, a polyether polyol and a mixture thereof.

6. The solvent-free polyurethane-based artificial leather of claim 5, wherein the polyester polyol has an average hydroxyl value of 100-450 mg KOH/g and a viscosity of 1,000-10,000 cps (25° C.).

7. The solvent-free polyurethane-based artificial leather of claim 5, wherein the polyether polyol has an average functional group number of 2-5 and an average hydroxyl value of 200-850 mg KOH/g.

8. The solvent-free polyurethane-based artificial leather of claim 4, wherein the retarding catalyst is selected from the group consisting of triethylene diamine (TEDA), triethylamine, tripropylamine, tributylamine, trioctylamine, pentamethylenediethylene triamine, dimethylcyclohexylamine, tris(3-dimethylamino)propylhexahydrotriamine and a mixture thereof.

9. The solvent-free polyurethane-based artificial leather of claim 4, wherein the diisocyanate-based compound is selected from the group consisting of toluene diisocyanate, diphenylmethane diisocyanate (MDI), torilene diisocyanate (TDI), hexamethylene diisocyanate and a mixture thereof.

10. The solvent-free polyurethane-based artificial leather of claim 4, wherein the diisocyanate prepolymer a free NCO content of 15-20 wt % at the end of the diisocyanate.

11. The solvent-free polyurethane-based artificial leather according to claim 1, which has a water content of 3.5-4.5 g/m$^2$.

12. A motor vehicle comprising the solvent-free polyurethane-based artificial leather according to claim 1.

* * * * *